United States Patent
Lin et al.

(10) Patent No.: US 9,442,583 B2
(45) Date of Patent: Sep. 13, 2016

(54) OPTICAL MOUSE APPARATUS AND DATA COMPRESSION METHOD USED IN OPTICAL MOUSE APPARATUS

(71) Applicant: PixArt Imaging Inc., Hsin-Chu (TW)

(72) Inventors: Yung-Chang Lin, Hsin-Chu (TW); Tsung-Fa Wang, Hsin-Chu (TW); Ching-Lin Chung, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 360 days.

(21) Appl. No.: 13/949,232

(22) Filed: Jul. 24, 2013

(65) Prior Publication Data

US 2014/0210723 A1    Jul. 31, 2014

(30) Foreign Application Priority Data

Jan. 25, 2013   (TW) .............................. 102102924 A (51) Int. Cl.
*G06F 3/038*   (2013.01)
*G06F 3/03*    (2006.01)
*G06F 1/32*    (2006.01)

(52) U.S. Cl.
CPC ........... *G06F 3/0383* (2013.01); *G06F 1/3259* (2013.01); *G06F 3/0317* (2013.01); *Y02B 60/1253* (2013.01)

(58) Field of Classification Search
CPC .................................................... G06F 3/0383
See application file for complete search history.

(56) References Cited

U.S. PATENT DOCUMENTS

| | | | | |
|---|---|---|---|---|
| 5,134,495 | A * | 7/1992 | Frazier et al. | 382/299 |
| 2002/0097430 | A1* | 7/2002 | Curry | 358/1.15 |
| 2004/0099798 | A1* | 5/2004 | Kwak | 250/221 |
| 2005/0231472 | A1* | 10/2005 | Gordon et al. | 345/157 |
| 2009/0160774 | A1* | 6/2009 | Lee et al. | 345/166 |
| 2014/0160024 | A1* | 6/2014 | Huang et al. | 345/166 |
| 2014/0210722 | A1* | 7/2014 | Chen et al. | 345/166 |
| 2015/0097779 | A1* | 4/2015 | Wang et al. | 345/166 |

* cited by examiner

*Primary Examiner* — Aneeta Yodichkas
*Assistant Examiner* — Karin Kiyabu
(74) *Attorney, Agent, or Firm* — Winston Hsu; Scott Margo (57) ABSTRACT

An optical mouse apparatus includes a light source circuit, a sensing circuit, and a processing circuit. The light source circuit is used for generating and emitting a light signal onto a surface so as to generate a light reflected signal. The sensing circuit is used for estimating an image offset of the optical mouse apparatus. The processing circuit is coupled to the light source circuit and the sensing circuit and used for generating and outputting a control signal to a terminal according to the image offset outputted by the sensing circuit. The sensing circuit is further used for detecting at least one of a moving speed or an offset direction of the image offset of the optical mouse apparatus, so as to dynamically determine whether to compress data of the image offset outputted to the processing circuit, for reducing data amount read by the processing circuit.

14 Claims, 8 Drawing Sheets

OPTICAL MOUSE APPARATUS AND DATA COMPRESSION METHOD USED IN OPTICAL MOUSE APPARATUS

BACKGROUND OF THE INVENTION

1. Field of the Invention

The disclosed embodiments of the present invention relate to an optical mouse mechanism, and more particularly, to an optical mouse apparatus and a data compression method utilized for an optical mouse apparatus.

2. Description of the Prior Art

Generally speaking, an optical mouse includes a sensing unit for detecting the image displacement generated by optical reflection. The sensing unit usually passes the generated image displacement to the following processing unit or control unit via a fixed number of data bits. Then the processing unit or the control unit will convert the image displacement data into a desired form and transmit it to a host terminal. Therefore, as to a sensing unit of the prior art, even though the actual displacement of an optical mouse is small or substantially zero, a fixed number of data bits of the detected image displacement will still be transmitted to the following processing unit or control unit. In other words, the following processing unit or control unit has to be activated for receiving/reading data from the sensing unit even though the actual displacement of the optical mouse is small or substantially zero, which consumes power of the optical mouse. Therefore, how to design the optical mouse for reducing power consumption of the image displacement reading process has become a challenge, especially for the case of the optical mouse being a wireless optical mouse.

SUMMARY OF THE INVENTION

Therefore, one of the objectives of the present invention is to provide an optical mouse apparatus and a data compression method utilized for an optical mouse apparatus, for solving the above-mentioned problems of the prior art to thereby save power consumption.

According to a first embodiment of the present invention, an optical mouse apparatus is disclosed. The optical mouse apparatus includes a light source unit, a sensing unit, and a processing unit. The light source circuit is arranged for generating and emitting an optical signal, which is emitted to a surface, and thereby forming an optical reflected signal. The sensing circuit is arranged for estimating an image displacement of the optical mouse apparatus according to the optical reflected signal. The processing circuit is coupled to the light source circuit and the sensing circuit, arranged for generating and outputting a control signal to a host terminal according to the image displacement outputted by the sensing circuit. Wherein the sensing circuit is further used for detecting at least one of a moving speed and an displacement direction of the image displacement of the optical mouse apparatus, so as to dynamically determine whether to compress a data amount of the image displacement outputted to the processing circuit for reducing the data amount read by the processing circuit.

According to a second embodiment of the present invention, a data compression method utilized for an optical mouse apparatus is disclosed. The method includes: generating and emitting an optical signal, which is emitted to a surface, and thereby forming an optical reflected signal; estimating an image displacement of the optical mouse apparatus according to the optical reflected signal; detecting at least one of a moving speed and an displacement direction of the image displacement of the optical mouse apparatus, so as to dynamically determine whether to compress a data amount of the outputted image displacement for reducing the data amount read by a processing circuit; and utilizing the processing circuit to generate and output a control signal to a host terminal according to the estimated image displacement.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
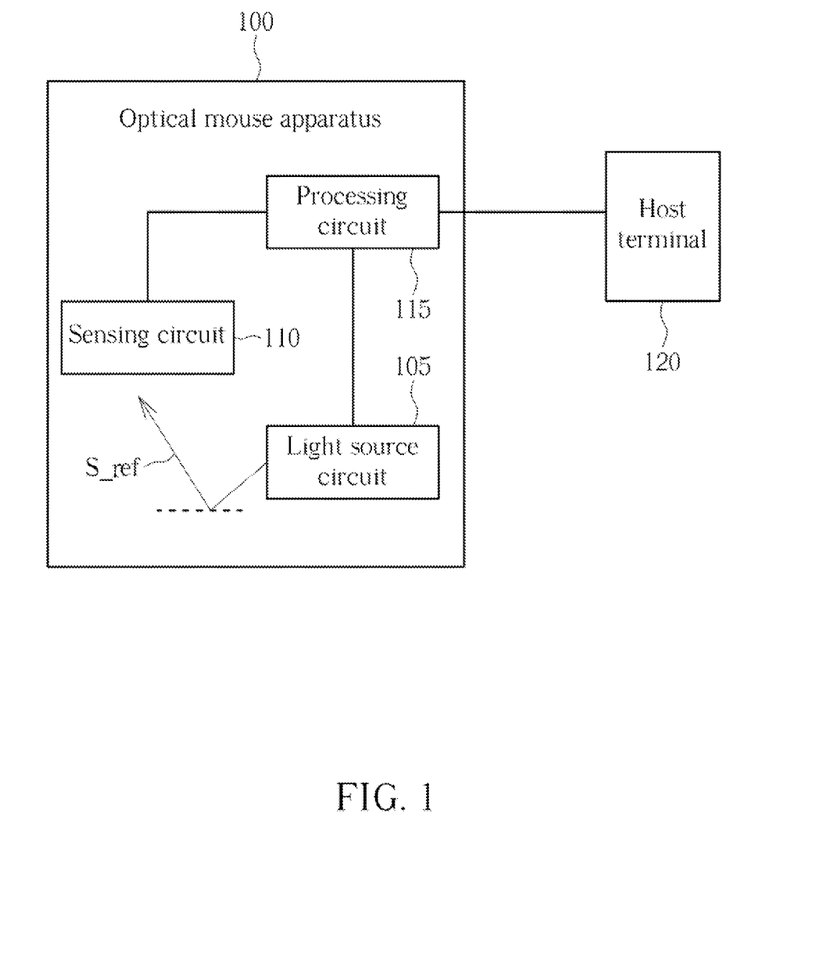
FIG. 1 is a block diagram illustrating an optical mouse apparatus according to a preferred embodiment of the present invention.

Please refer to FIG. 1, which is a block diagram illustrating an optical mouse apparatus 100 according to a preferred embodiment of the present invention. The optical mouse apparatus 100 includes a light source circuit 105, a sensing circuit 110, and a processing circuit 115. The optical mouse apparatus 100 is further connected to a host terminal 120. The light source circuit 105 is used for generating and emitting an optical signal, which is emitted upon a surface and then forms an optical reflected signal S_ref. The sensing circuit 110 is coupled to the light source circuit 105, and used for estimating an image displacement of the optical mouse apparatus 100 according to the optical reflected signal S_ref. The processing circuit 115 is coupled to the light source circuit 105 and the sensing circuit 110, and used for generating and outputting a control signal S_c to the host terminal 120 according to the image displacement outputted by the sensing circuit 110. In addition, the sensing circuit 110 is further used for detecting at least one of a moving speed and a displacement direction of the image displacement of the optical mouse apparatus 100, so as to dynamically determine whether to compress data of the image displacement outputted to the processing circuit 115 for reducing the data amount read by the processing circuit 115. The processing circuit 115 is used for converting format of the read data into PS/2 or USB format, and generating and outputting the control signal S_c to the host terminal 120. Specifically, the above-mentioned dynamical data compression process is achieved by using the sensing circuit 110 to detect and analyze contents of the image displacement, and pass the results to the processing circuit 115 for allowing the processing circuit 115 to know the following contents to be read, so as to reduce unnecessary data access. For instance, the sensing circuit 110 generates a corresponding detection result, and outputs the corresponding detection result to the processing circuit 115. In this way, the processing circuit 115 can learn the order and contents of the following data to be read. Hence, the sensing circuit 110 can refer to the corresponding detection result to discard or ignore a part of contents of the image displacement and then generate a compressed data; and output the compressed data to the processing circuit 115. The objective of reducing the data amount needed to be read by the processing circuit 115 is achieved. Moreover, by using the sensing circuit 110 to pass the corresponding detection result to the processing circuit 115, this allows the processing circuit 115 to know order and corresponding content of the following data while receiving/reading data. In this way, the processing circuit 115 is prevented from making a mistake while receiving/reading the data. Thus, as can be seen from the above, in different operation cases, data amounts of different image displacement data from the sensing circuit 110 of the optical mouse apparatus 100 to the processing circuit 115 could be different (i.e., the numbers of the data bits of different image displacement data are different). Therefore, the overall data amount needed to be read by the processing circuit 115 is reduced, and the overall data reading time of the processing circuit 115 is saved, thereby reducing the power consumption.

More specifically, when the sensing circuit 110 estimates the image displacement of the optical mouse apparatus 100 according to the optical reflected signal S_ref, a displacement amount is estimated by sampling multiple images corresponding to the image displacement. While sampling the image displacement for estimating the displacement amount, the sampling precision (resolution) is based on a predetermined value, which is represented by counts per inch (CPI), that is, the sampling precision of the optical mouse apparatus 100 per inch. For instance, if the CPI value is 400, when the optical mouse apparatus 100 moves one inch, the sensing circuit 110 will perform the image displacement sampling process 400 times; when the optical mouse apparatus 100 moves more than or less than one inch, the sampling process will be performed more than or less than 400 times. Therefore, the number of sampling processes the sensing circuit 110 performs within a unit time indicates the moving distance or the moving speed of the optical mouse apparatus 100. That is, more sampling processes performed by the sensing circuit 110 within a unit time indicates that the moving distance of the optical mouse apparatus 100 is longer or the moving speed of the optical mouse apparatus 100 is higher. On the contrary, fewer sampling processes performed by the sensing circuit 110 within a unit time indicates that the moving distance of the optical mouse apparatus 100 is shorter or the moving speed of the optical mouse apparatus 100 is lower. Thus, the sensing circuit 110 can estimate the corresponding moving speed within a unit time based on the sampling frequency, and then the moving speed of the optical mouse apparatus 100 can be determined by comparing the estimated moving speed with a speed threshold. If the determining result indicates that the moving speed is higher than the speed threshold, the moving speed will be regarded as a high speed; and if the determining result indicates that the moving speed is lower than the speed threshold, the moving speed will be regarded as a low speed. For high moving speed, the sensing circuit 110 has a higher sampling frequency, which needs more data bits to represent the sampled data. However, for low moving speed, the sensing circuit 110 has a lower sampling frequency, which needs fewer data bits to represent the sampled data. Assume that data of an image displacement generated by the sensing circuit 110 is composed of a low-byte data and a high-byte data. In a case where the sensing circuit 110 detects the moving speed is lower than the speed threshold, this means the sampling frequency is not high due to low moving speed. The sensing circuit 110 will discard or ignore the high-byte data and only output the low-byte data to the processing circuit 115 (i.e., no high-byte data is transmitted to the processing circuit 115) for compressing the data of the image displacement and reducing bandwidth between the sensing circuit 110 and the processing circuit 115. However, if the sensing circuit 110 detects the moving speed is higher than the speed threshold, this means the sampling frequency is above a certain degree due to high moving speed. The sensing circuit 110 will not discard or ignore the high-byte data. Afterwards, the high-byte and low-byte data (the complete image displacement data) will be outputted to the processing circuit 115.

In addition, in the above-mentioned embodiments, the sensing circuit 110 estimates the moving speed based on the sampling frequency, and compares the moving speed with the speed threshold for determining whether the moving speed is high or low. In other embodiments, the sensing circuit 110 may directly compare the sampling frequency with a sampling frequency threshold (which corresponds to the aforementioned speed threshold) to determine whether the moving speed is high or low. In other words, according to the present invention, any mechanism for determining whether the optical mouse apparatus 100 moves in high speed or low speed is applicable for the process of dynamically compressing the image displacement data of the sensing circuit 110. Thus, any mechanism for determining the moving speed to dynamically compress the image displacement data of the sensing circuit 110 belongs to the scope of the present invention, Moreover, as to detecting the direction of the image displacement for dynamically determining whether to compress the image displacement data outputted to the processing circuit 115, when the sensing circuit 110 estimates the image displacement of the optical mouse apparatus 100 according to the optical reflected signal S_ref, it can be detected that the image displacement has different displacement components in horizontal direction and vertical direction. With regard to the image displacement data composed of a low-byte data and a high-byte data, if the image displacement has horizontal and vertical displacement components, then the low-byte data and the high-byte data will both include horizontal and vertical displacement components. Therefore, if the sensing circuit 110 detects that the image displacement only includes a vertical displacement component without a horizontal displacement component, this means the optical mouse apparatus 100 only has vertical movement, that is, the horizontal displacement is equal to zero. In this case, since the horizontal displacement component is equal to zero, so it does not need to be transferred to the processing circuit 115. Hence, the amount of data transmission can be reduced. Therefore, in practice, the sensing circuit 110 does not transfer the zero horizontal displacement component to the processing circuit 115, and only transfer the non-zero vertical displacement component to the processing circuit 115. To put it another way, the sensing circuit 110 discards or ignores the displacement component in the horizontal direction (i.e. discards or ignores a part of contents of the image displacement) for compressing the overall data amount of the image displacement. On the other hand, if the sensing circuit 110 detects that the image displacement only includes a horizontal displacement component without a vertical displacement component, this means the optical mouse apparatus 100 only has horizontal movement, that is, the vertical displacement is equal to zero. In this case, since the vertical displacement component is equal to zero, so it does not need to be transferred to the processing circuit 115. Hence, the amount of data transmission can be reduced. Therefore, in practice, the sensing circuit 110 will not transfer the zero vertical displacement component to the processing circuit 115, and only transfer the non-zero horizontal displacement component to the processing circuit 115. To put it another way, the sensing circuit 110 discards or ignores the displacement component in the vertical direction (i.e., discards or ignores a part of contents of the image displacement) for compressing the overall data amount of the image displacement. It should be noted that the process of determining whether the horizontal or vertical displacement component is zero can also be achieved by comparing the displacement component with a threshold value.

Figure 2A:
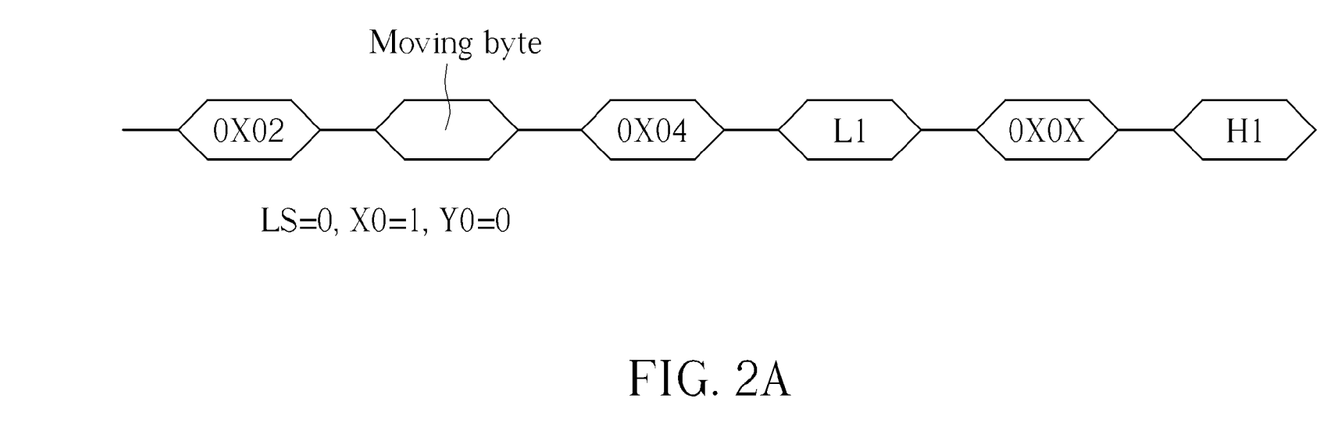
FIGS. 2A-2H are diagrams illustrating data content transmitted in serial between the sensing circuit and the processing circuit according to embodiments of the present invention.
Figure 2B:
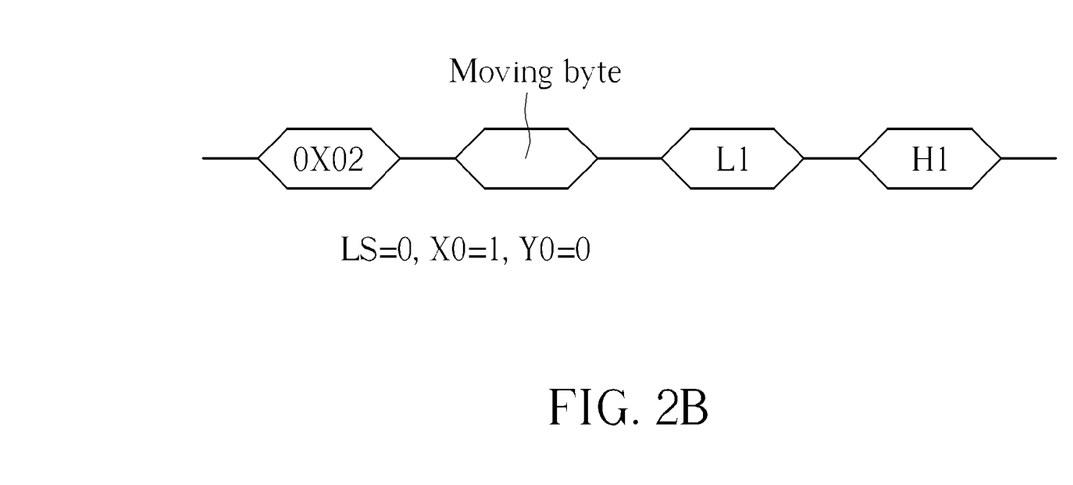

In addition, it should be noted that the corresponding detecting result generated by the sensing circuit 110 may be represented by different data bits of a motion byte, wherein the sensing circuit 110 transmits the data bit to the processing circuit 115 to notify the generated corresponding detection result. For instance, a high speed/low speed detection result could be indicated by a specific bit LS, where the bit LS with a value 0 represents high speed, and the bit LS with a value 1 represents low speed; a specific bit X0 could be used to indicate whether the horizontal displacement component is zero or not, where the bit X0 with a value 1 represents there is no horizontal displacement component, and the bit X0 with a value 0 represents there is a horizontal displacement component; a specific bit Y0 could be used to indicate whether the vertical displacement component is zero or not, where the bit Y0 with a value 1 represents there is no vertical displacement component, and the bit Y0 with a value 0 represents there is a vertical displacement component. Please refer to FIGS. 2A-2H, which are diagrams illustrating data content transmitted between the sensing circuit 110 shown in FIG. 1 and the processing circuit 115 according to different embodiments of the present invention. As shown in FIG. 2A, the sensing circuit 110 detects that the optical mouse apparatus 100 has high-speed movement in the vertical direction only. Therefore, the sensing circuit 110 outputs the bits LS, X0 and Y0 as 0, 1 and 0, respectively, to the processing circuit 115, and then outputs data of the vertical displacement component (indicated by low-byte data bit L1 and high-byte data bit H1 respectively), wherein the low-byte data bit L1 and the high-byte data bit H1 both include no horizontal displacement component. After the processing circuit 115 has read the detection result of bits LS, X0 and Y0, it will know that the sensing circuit 110 only transmits the vertical displacement component with high-byte data and low-byte data to the processing circuit 115, which ensures the data reception to be performed without error. 0x02, 0x04, and 0x0x represent different address data, respectively, where 0x02 is utilized for locating data of the aforementioned motion byte, 0x04 is utilized for locating the low-byte data of the vertical displacement component, and 0x0x is utilized for locating the high-byte data of the vertical displacement component. The processing circuit 115 can determine the format of the following data after reading the above-mentioned motion byte. Therefore, in another embodiment, a part of the address data may be ignored. For instance, as can be seen in FIG. 2B, if the bits LS, X0, Y0 are 0, 1, 0, respectively, the processing circuit 115 will know that the data to be received are low-byte data and high-byte data of the vertical displacement component. Hence, the address data of 0x04 and 0x0x can be discarded. In other words, the low-byte data bit L1 and high-byte data bit H1 will be received and read, directly.

Figure 2C:
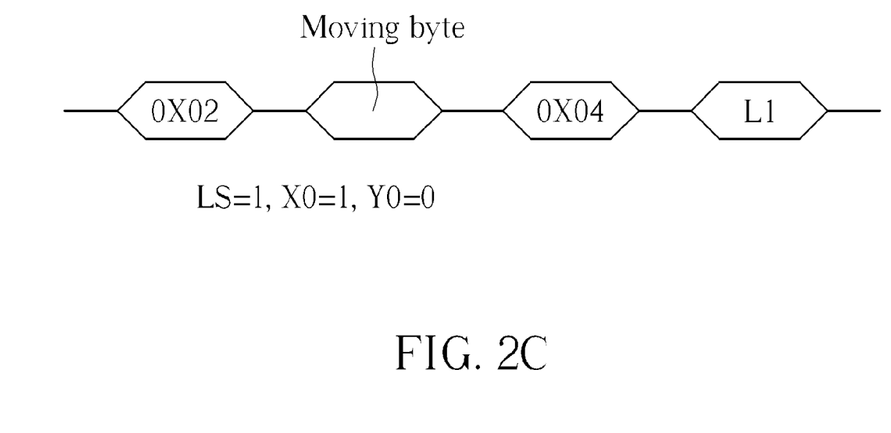
Figure 2D:
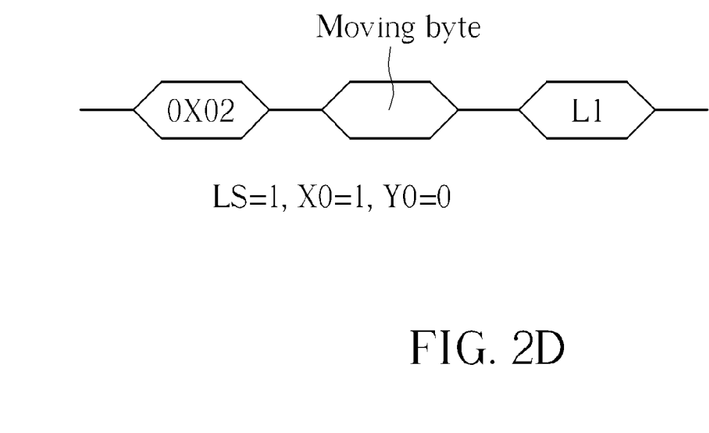

Moreover, as can be seen in FIG. 2C, the sensing circuit 110 detects that the optical mouse apparatus 100 has low-speed movement in the vertical direction only. Therefore, the sensing circuit 110 outputs the bits LS, X0 and Y0 as 1, 1 and 0, respectively, to the processing circuit 115, and then further outputs data of the vertical displacement component (only indicated by low-byte data bit L1 without high-byte data bit H1 due to low speed), wherein the low-byte data bit L1 includes no horizontal displacement component. After the processing circuit 115 has read the detection result of bits LS, X0 and Y0, it will know that the sensing circuit 110 only transmits the vertical displacement component with low-byte data only to the processing circuit, which ensures the data reception to be performed without error. 0x02 and 0x04 represent different address data, respectively, where 0x02 is utilized for locating data of the aforementioned motion byte, and 0x04 is utilized for locating the low-byte data of the vertical displacement component. The processing circuit 115 can determine the format of the following data after reading the above-mentioned motion byte. Therefore, in another embodiment, a part of the address data may be ignored. For instance, as can be seen in FIG. 2D, if the bits LS, X0 and Y0 are 1, 1 and 0, respectively, the processing circuit 115 will know that the data to be received is low-byte data of the vertical displacement component. Hence, the address data of 0x04 can be discarded. In other words, the low-byte data bit L1 will be received and read, directly.

Figure 2E:
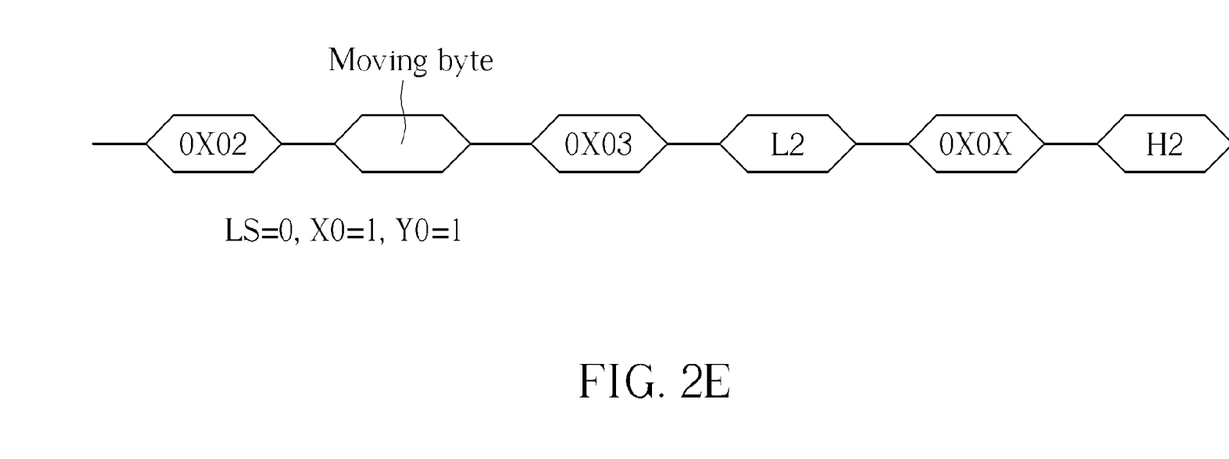
Figure 2F:
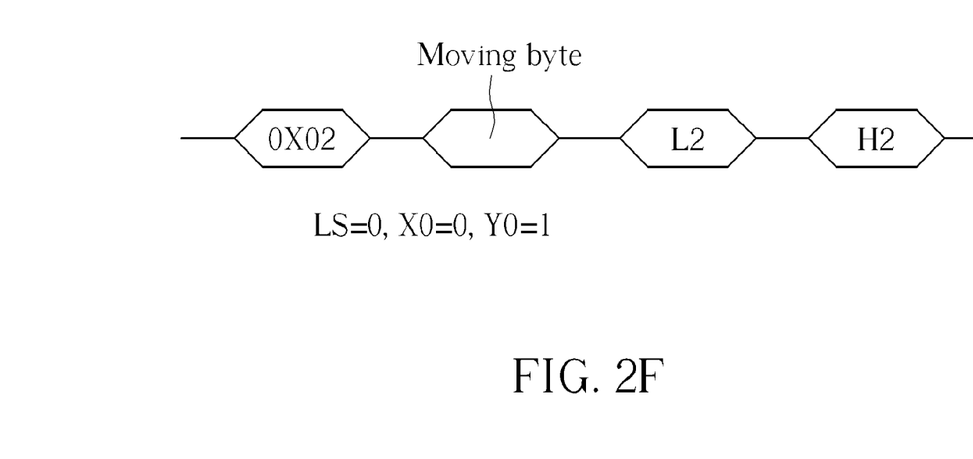

Moreover, as can be seen in FIG. 2E, the sensing circuit 110 detects that the optical mouse apparatus 100 has high-speed movement in the horizontal direction only. Therefore, the sensing circuit 110 outputs the bits LS, X0 and Y0 as 0, 0 and 1, respectively, to the processing circuit 115, and then further outputs data of the horizontal displacement component (indicated by low-byte data bit L2 and high-byte data bit H2 respectively), wherein the low-byte data bit L2 and the high-byte data bit H2 both include no vertical displacement component. After the processing circuit 115 has read the detection result of bits LS, X0 and Y0, it will know that the sensing circuit 110 only transmits horizontal displacement component with high-byte and low-byte data to the processing circuit, which ensures the data reception to be performed without error. 0x02, 0x03, and 0x0x represent different address data, respectively, where 0x02 is utilized for locating data of the aforementioned motion byte, 0x03 is utilized for locating the low-byte data of the horizontal displacement component, and 0x0x is utilized for locating the high-byte data of the horizontal displacement component. The processing circuit 115 can determine the format of the following data after reading the above-mentioned motion byte. Therefore, in another embodiment, a part of the address data may be ignored. For instance, as can be seen in FIG. 2F, if the bits LS, X0 and Y0 are 0, 0 and 1, respectively, the processing circuit 115 will know that the data to be received is low-byte data and high-byte data of the horizontal displacement component. Hence, the address data of 0x03 and 0x0x can be discarded. In other words, the low-byte data bit L2 and high-byte data bit H2 will be received and read, directly.

Figure 2G:
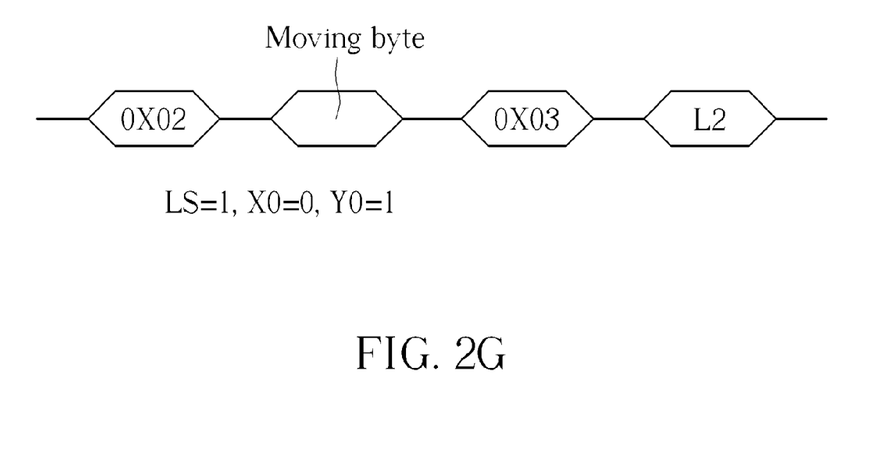
Figure 2H:
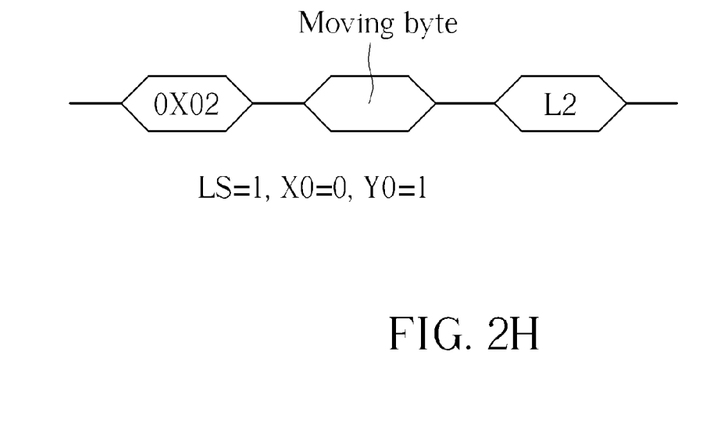
Figure 3A:
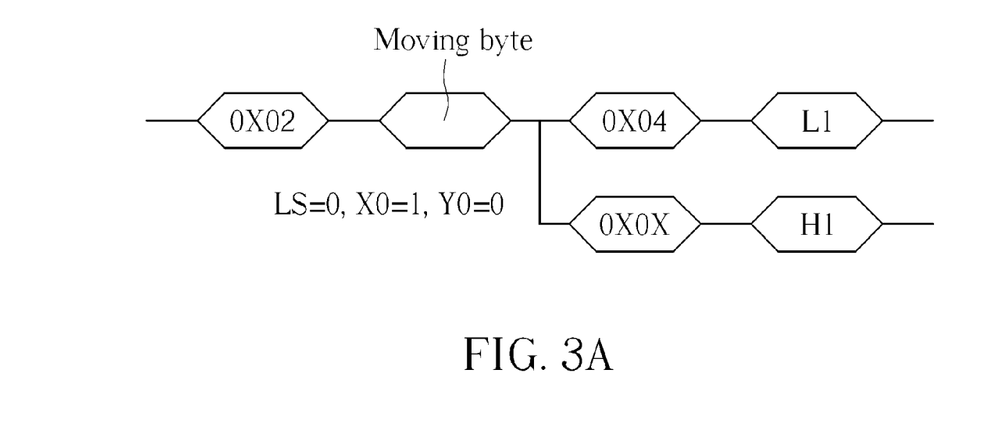
FIGS. 3A-3D are diagrams illustrating data content transmitted in parallel between the sensing circuit and the processing circuit according to embodiments of the present invention.
Figure 3B:
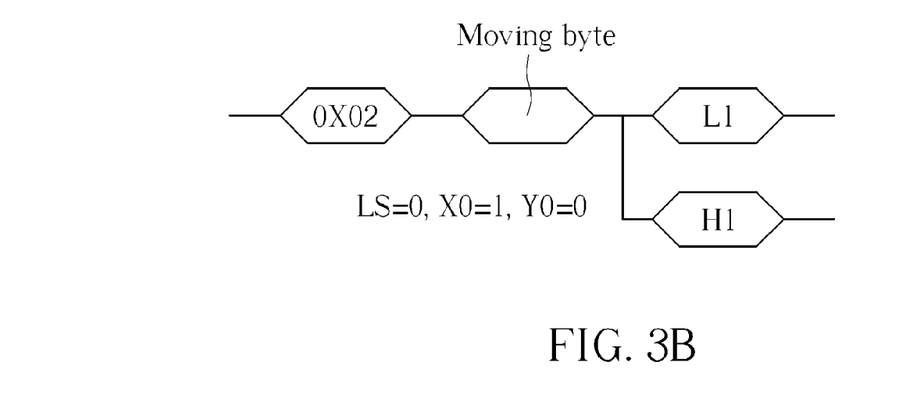
Figure 3C:
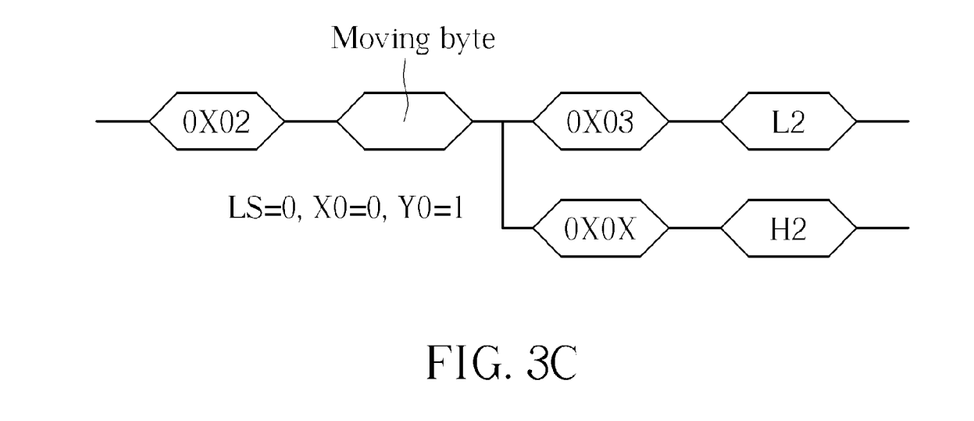
Figure 3D:
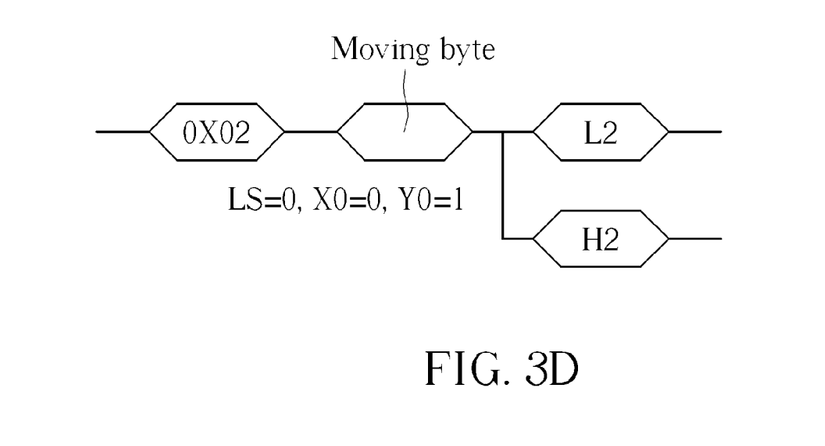

Moreover, as can be seen in FIG. 2G, the sensing circuit 110 detects that the optical mouse apparatus 100 has low-speed movement in the horizontal direction only. Therefore, the sensing circuit 110 outputs bits LS, X0 and Y0 as 1, 0 and 1, respectively, to the processing circuit 115, and then further outputs data of the horizontal displacement component (only indicated by low-byte data bit L2 without high-byte data bit H2 due to low speed), wherein the low-byte data bit L2 includes no vertical displacement component. After the processing circuit 115 has read the detection result of bits LS, X0 and Y0, it will know that the sensing circuit 110 only transmits horizontal displacement component with low-byte data only to the processing circuit, which ensures the data reception to be performed without error. 0x02 and 0x03 represent different address data, respectively, where 0x02 is utilized for locating data of the aforementioned motion byte, and 0x03 is utilized for locating the low-byte data of the horizontal displacement component. The processing circuit 115 can determine the format of the following data after reading the above-mentioned motion byte. Therefore, in another embodiment, a part of the address data may be ignored. For instance, as can be seen in FIG. 2H, if the bits LS, X0 Y0 are 1, 0 and 1, respectively, the processing circuit 115 will know that the data to be received is low-byte data of the horizontal displacement component. Hence, the address data of 0x03 can be discarded. In other words, the low-byte data bit L2 will be received and read, directly.

Furthermore, it should be noted that the data compression performed by the above-mentioned sensing circuit 110 is only a preferred embodiment of the present invention. Other alterations of the embodiment are also applicable to the present invention. For instance, the sensing circuit 110 could also determine whether to perform compression upon the image displacement data by only referring to one of the determined moving speed and direction, which helps to reduce the overall data access time for the processing circuit 115 and accordingly save power consumption. Besides, with regard to user's behavior, a user usually operates a mouse apparatus in a low speed for most of the time. Thus, the above-mentioned embodiments can significantly reduce the data access time and power consumption.

In addition, although FIGS. 2A-2H illustrate the serial transmission, the data transmission between the sensing circuit 110 and the processing circuit 115 in other embodiments could adopt a parallel transmission scheme. For instance, please refer to FIGS. 3A-3D, which correspond to FIGS. 2A, 2B, 2E and 2F, respectively, wherein the image displacement data transmission between the sensing circuit 110 and the processing circuit 115 in FIGS. 2A, 2B, 2E and 2F is performed by serial transmission. That is, data bit of the low-byte and data bit of the high-byte are transmitted, sequentially. However, the image displacement data transmission between the sensing circuit 110 and the processing circuit 115 in FIGS. 3A-3D is performed by parallel transmission. That is, data bit of the low-byte and data bit of the high-byte are transmitted, simultaneously. Please refer to the above paragraphs for details of other operations, which will be omitted here for brevity.

Figure 4:
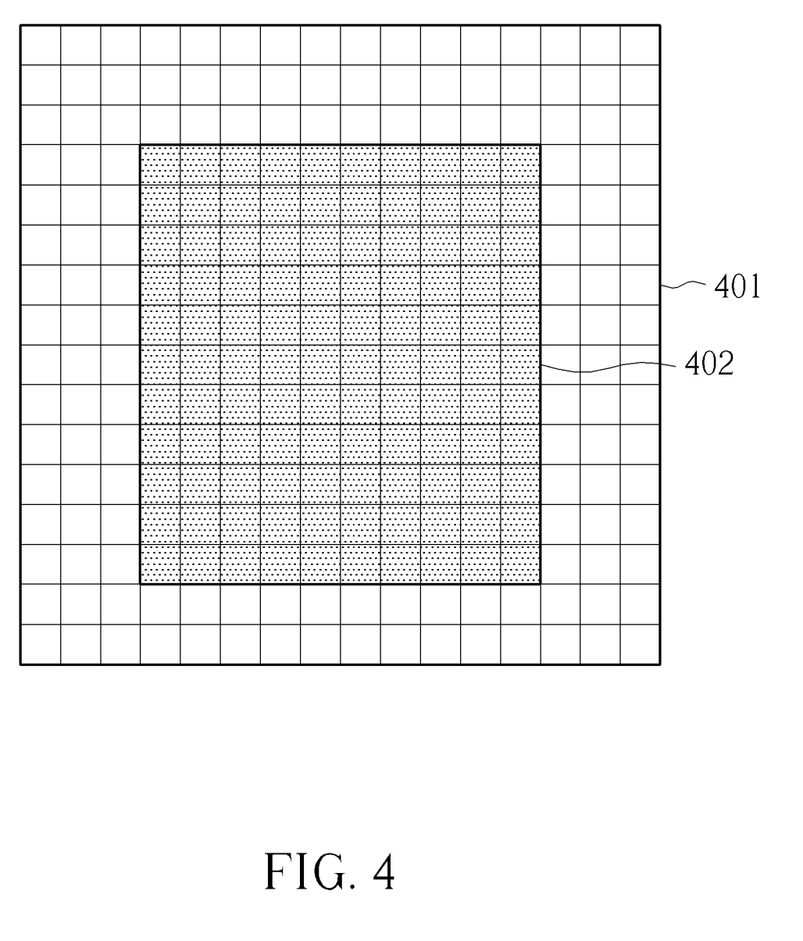
FIG. 4 is a diagram illustrating different detection windows corresponding to high/low speed employed by the optical mouse apparatus shown in FIG. 1.

In other embodiments, the aforementioned process of determining whether to reduce data amount transmitted between the sensing circuit 110 and the processing circuit 115 by detecting the moving speed of the optical mouse apparatus 100 could be combined with dynamical adjustment of the detection window of the sensing circuit 110. Please refer to FIG. 4, which is a diagram illustrating different detection windows corresponding to high/low speed employed by the optical mouse apparatus 100 shown in FIG. 1. As mentioned above, the sensing circuit 110 estimates the corresponding moving speed within a unit time, and compares the estimated moving speed with the speed threshold. If the moving speed is higher than the speed threshold, it will be determined that the moving speed is the high moving speed; and if the moving speed is lower than the speed threshold, it will be determined that the moving speed is the low moving speed. In a case where the high moving speed is detected, the sensing circuit 110 uses a larger detection window to perform image displacement detection. As can be seen in FIG. 4, the sensing circuit 110 uses a larger detection window 401 (also known as a main window) for detecting image displacement when the optical mouse apparatus 100 operates under high moving speed, and uses a smaller detection window 402 (also known as an auxiliary window) for detecting image displacement when the optical mouse apparatus 100 operates under low moving speed. In this way, the smaller sized auxiliary window helps to save power and achieves the objective of reducing the data amount read by the processing circuit 115. For instance, using the smaller sized detection window 402 to detect the image displacement can reduce the data amount of image displacement, so as to achieve the objective of image displacement data compression. In addition, in another embodiment, the optical mouse apparatus 100 can operate in one of a normal mode and a sleeping mode. If the optical mouse apparatus 100 is in the normal mode and has low moving speed, the sensing circuit 110 will detect image displacement through the auxiliary window 402, thus achieving power-saving in the normal mode. On the other hand, if the optical mouse apparatus 100 has no displacement and operates in the sleeping mode, the sensing circuit 110 will detect image displacement through the auxiliary window 402, thus achieving power-saving due to the smaller detection window. Once the sensing circuit 110 detects displacement, the optical mouse apparatus 100 will be switched into the normal mode from the sleeping mode, and the sensing circuit 110 will uses the main window 401 to detect image displacement. Afterwards, the moving speed is referenced to determine which one of the main window 401 and the auxiliary window 402 is sued to detect the image displacement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical mouse apparatus, comprising:
 a light source circuit, arranged for generating and emitting an optical signal, wherein the optical signal is emitted upon a surface and then forms an optical reflected signal;
 a sensing circuit, arranged for estimating an image displacement of the optical mouse apparatus according to the optical reflected signal; and
 a processing circuit, coupled to the light source circuit and the sensing circuit, the processing circuit arranged for generating and outputting a control signal to a host terminal according to the image displacement outputted by the sensing circuit;

wherein the sensing circuit is further arranged for detecting at least one of a moving speed and a displacement direction of the image displacement of the optical mouse apparatus to dynamically determine whether to compress data of the image displacement outputted to the processing circuit for reducing a data amount read by the processing circuit; the data of the image displacement is composed of a low-byte data and a high-byte data; when the sensing circuit detects that the moving speed is lower than a threshold, the sensing circuit generates a corresponding detection result, generates a compressed data by compressing the data of the image displacement outputted to the processing circuit according to the corresponding detection result, and outputs the corresponding detection result for notifying the processing circuit to receive and read the compressed data; the data amount read by the processing circuit is reduced by the sensing circuit by discarding or ignoring the high-byte data for compressing the data of the image displacement, where the high-byte data is not outputted to the processing circuit.

2. The optical mouse apparatus of claim 1, wherein the sensing circuit outputs the low-byte data to the processing circuit and does not output an address data of the low-byte data to the processing circuit for generating the compressed data to reduce the data amount read by the processing circuit.

3. The optical mouse apparatus of claim 1, wherein when the sensing circuit detects that the displacement direction includes one of a horizontal direction and a vertical direction only, the sensing circuit generates a corresponding detection result, generates a compressed data by compressing the data of the image displacement outputted to the processing circuit according to the corresponding detection result, and outputs the corresponding detection result for notifying the processing circuit to receive and read the compressed data.

4. The optical mouse apparatus of claim 3, wherein the data of the image displacement includes a data bit of a first displacement direction and a data bit of a second displacement direction; when the sensing circuit detects that the displacement direction does not include the second displacement direction, the sensing circuit reduces the data amount read by the processing circuit by discarding or ignoring the data bit of the second displacement direction for compressing the data of the image displacement, where the data bit of the second displacement direction is not outputted to the processing circuit.

5. The optical mouse apparatus of claim 4, wherein the first displacement direction is one of a horizontal displacement direction and a vertical displacement direction, and the second displacement direction is another one of the horizontal displacement direction and the vertical displacement direction.

6. The optical mouse apparatus of claim 4, wherein when the sensing circuit detects that the displacement direction does not include the second displacement direction, the sensing circuit outputs the data bit of the first displacement direction to the processing circuit, and does not output an address data of the data bit of the first displacement direction to the processing circuit for generating the compressed data to reduce the data amount read by the processing circuit.

7. The optical mouse apparatus of claim 1, wherein when the sensing circuit detects that the moving speed is lower than the threshold, the sensing circuit changes a size of a detection window to use a detection window with a smaller size for reducing and compressing the data of the image displacement outputted to the processing circuit.

8. A data compression method utilized in an optical mouse apparatus, comprising:

generating and emitting an optical signal, wherein the optical signal is emitted upon a surface, and then forms an optical reflected signal;

estimating an image displacement of the optical mouse apparatus according to the optical reflected signal;

detecting at least one of a moving speed and a displacement direction of the image displacement of the optical mouse apparatus to dynamically determine whether to compress data of the outputted image displacement for reducing a data amount read by a processing circuit; and utilizing the processing circuit to generate and output a control signal to a host terminal according to the estimated image displacement;

wherein the data of the image displacement is composed of a low-byte data and a high-byte data; and the step of dynamically determining whether to compress the data of the image displacement outputted to the processing circuit comprises:

when the moving speed is detected to be lower than a threshold, generating a corresponding detection result, and generating a compressed data by compressing the data of the image displacement outputted to the processing circuit according to the corresponding detection result; and outputting the corresponding detection result for notifying the processing circuit to receive and read the compressed data;

wherein the step of compressing the data of the image displacement outputted to the processing circuit comprises:

reducing the data amount of the processing circuit by discarding or ignoring the high-byte data for compressing the data of the image displacement, where the high-byte data is not outputted to the processing circuit.

9. The data compression method of claim 8, wherein the step of compressing the data of the image displacement outputted to the processing circuit comprises:

outputting the low-byte data to the processing circuit and not outputting an address data of the low-byte data to the processing circuit for generating the compressed data to reduce the data amount read by the processing circuit.

10. The data compression method of claim 8, wherein the step of dynamically determining whether to compress the data of the outputted image displacement comprises:

when it is detected that the displacement direction includes one of a horizontal direction and a vertical direction only, generating a corresponding detection result, generating a compressed data by compressing the data of the image displacement outputted to the processing circuit according to the corresponding detection result, and outputting the corresponding detection result for notifying the processing circuit to receive and read the compressed data.

11. The data compression method of claim 10, wherein the data of the image displacement includes a data bit of a first displacement direction and a data bit of a second displacement direction; and the step of compressing the data of the image displacement outputted to the processing circuit comprises:

when it is detected that the displacement direction does not include the second displacement direction, reducing the data amount read by the processing circuit by discarding or ignoring the data bit of the second displacement direction for compressing the data of the image displacement, where the data bit of the second displacement direction is not outputted to the processing circuit.

12. The data compression method of claim 11, wherein the first displacement direction is one of a horizontal displacement direction and a vertical displacement direction, and the second displacement direction is another one of the horizontal displacement direction and the vertical displacement direction.

13. The data compression method of claim 11, wherein when it is detected that the displacement direction does not include the second displacement direction, the step of compressing the data of the image displacement outputted to the processing circuit comprises:

outputting the data bit of the first displacement direction to the processing circuit, and not outputting an address data of the data bit of the first displacement direction to the processing circuit for generating the compressed data to reduce the data amount read by the processing circuit.

14. The data compression method of claim 8, wherein the step of dynamically determining whether to compress the data of the outputted image displacement comprises:

when the moving speed is detected to be lower than the threshold, changing a size of a detection window to use a detection window with a smaller size for reducing and compressing the data of the image displacement outputted to the processing circuit.

* * * * *

UNITED STATES PATENT AND TRADEMARK OFFICE
CERTIFICATE OF CORRECTION

PATENT NO. : 9,442,583 B2
APPLICATION NO. : 13/949232
DATED : September 13, 2016
INVENTOR(S) : Yung-Chang Lin et al.

Page 1 of 1

It is certified that error appears in the above-identified patent and that said Letters Patent is hereby corrected as shown below:

On the Title Page

Item (72), add --Chun-Wei Chen, Hsin-Chu (TW)-- to be the 4th inventor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*